(12) United States Patent
Iyoshi et al.

(10) Patent No.: US 12,442,463 B2
(45) Date of Patent: Oct. 14, 2025

(54) VALVE OPENING CIRCUIT AND HEAT PUMP DEVICE

(71) Applicant: DAIKIN INDUSTRIES, LTD., Osaka (JP)

(72) Inventors: Yuuta Iyoshi, Osaka (JP); Yoshiki Yamanoi, Osaka (JP); Kumiko Saeki, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 303 days.

(21) Appl. No.: 17/945,567

(22) Filed: Sep. 15, 2022

(65) Prior Publication Data
US 2023/0019373 A1    Jan. 19, 2023

Related U.S. Application Data

(63) Continuation of application No. PCT/JP2020/045626, filed on Dec. 8, 2020.

(30) Foreign Application Priority Data

Apr. 16, 2020 (JP) .................................. 2020-073358

(51) Int. Cl.
| | |
|---|---|
| *F25B 41/20* | (2021.01) |
| *F16K 31/04* | (2006.01) |
| *F25B 30/00* | (2006.01) |
| *H02J 9/06* | (2006.01) |

(52) U.S. Cl.
CPC ............ *F16K 31/042* (2013.01); *F25B 30/00* (2013.01); *F25B 41/20* (2021.01); *H02J 9/061* (2013.01); *F25B 2600/25* (2013.01)

(58) Field of Classification Search
CPC ...... F25B 41/20; F25B 30/00; F25B 2600/25; H02J 9/061; F16K 31/042
See application file for complete search history.

(56) References Cited

FOREIGN PATENT DOCUMENTS

| | | | |
|---|---|---|---|
| JP | 2007-46793 A | | 2/2007 |
| JP | 2008-20133 A | | 1/2008 |
| JP | 2008020133 A | * | 1/2008 |
| JP | 2013-210110 A | | 10/2013 |

(Continued)

OTHER PUBLICATIONS

Tanaka, Air Conditioner, 2012, Full Document (Year: 2012).*

(Continued)

*Primary Examiner* — Nael N Babaa
(74) *Attorney, Agent, or Firm* — Birch, Stewart, Kolasch & Birch, LLP (57) ABSTRACT

A valve opening circuit mounted on a heat pump device having a valve on a refrigerant circuit includes a DC electric path to which a DC voltage generated from an AC voltage for normal use is applied, a valve drive circuit that opens and closes the valve by using the DC voltage of the DC electric path, a control unit that acquires a control power source voltage based on the DC voltage of the DC electric path and controls the valve drive circuit, and a power feed port connected to the DC electric path and connectable to a DC power source line provided from outside for emergency. The control unit causes the valve drive circuit to open the valve when the AC voltage is lost and the DC voltage is fed from the DC power source line to the power feed port.

9 Claims, 9 Drawing Sheets

(56) References Cited

FOREIGN PATENT DOCUMENTS

| | | | |
|---|---|---|---|
| JP | 2014119153 A | * | 6/2014 |
| JP | 2018179316 A | * | 11/2018 |
| JP | 2019-20113 A | | 2/2019 |

OTHER PUBLICATIONS

Mitsuhiro, Cryogenic device and operation method of cryogenic device, 2017, Full Document (Year: 2017).*
Tamura, Outdoor Unit, 2008, Full Document (Year: 2008).*
Extended European Search Report dated Sep. 25, 2023 for Application No. 20931122.4.
International Search Report (PCT/ISA/210) issued in PCT/JP2020/045626, dated Jan. 26, 2021.
International Preliminary Report on Patentability and English translation of the Written Opinion of the International Searching Authority for International Application No. PCT/JP2020/045626, dated Oct. 13, 2022.

* cited by examiner

VALVE OPENING CIRCUIT AND HEAT PUMP DEVICE

CROSS REFERENCE TO RELATED APPLICATIONS

This application is a Continuation of PCT International Application No. PCT/JP2020/045626, filed on Dec. 8, 2020, which claims priority under 35 U.S.C. 119(a) to Patent Application No. 2020-073358, filed in Japan on Apr. 16, 2020, all of which are hereby expressly incorporated by reference into the present application.

TECHNICAL FIELD

The present disclosure relates to a heat pump device that executes a refrigeration cycle by using a refrigerant, and to a valve opening circuit of the heat pump device.

BACKGROUND ART

A representative example of a heat pump device that executes a refrigeration cycle using a refrigerant is an air conditioner. In the air conditioner, when a commercial AC power source is lost due to a power failure or the like, an internal valve is closed to prevent a refrigerant leakage (see, for example, Patent Literature 1).

On the other hand, when the air conditioner is removed, it is required to appropriately collect the refrigerant inside.

CITATION LIST

Patent Literature

PATENT LITERATURE 1: Japanese Laid-Open Patent Publication No. 2019-20113

SUMMARY (1) A valve opening circuit of the present disclosure is a valve opening circuit mounted on a heat pump device having a valve on a refrigerant circuit, the valve opening circuit including a DC electric path to which a DC voltage generated from an AC voltage for normal use is applied, a valve drive circuit that opens and closes the valve by using the DC voltage of the DC electric path, a control unit that acquires a control power source voltage based on the DC voltage of the DC electric path and controls the valve drive circuit, and a power feed port connected to the DC electric path and connectable to a DC power source line provided from outside for emergency. The control unit causes the valve drive circuit to open the valve when the AC voltage is lost and the DC voltage is fed from the DC power source line to the power feed port.

(2) A heat pump device of the present disclosure is a heat pump device having a valve on a refrigerant circuit, the heat pump device including a DC electric path to which a DC voltage generated from an AC voltage for normal use is applied, a valve drive circuit that opens and closes the valve by using the DC voltage of the DC electric path, a control unit that acquires a control power source voltage based on the DC voltage of the DC electric path and controls the valve drive circuit, and a power feed port connected to the DC electric path and connectable to a DC power source line provided from outside for emergency. The control unit causes the valve drive circuit to open the valve when the AC voltage is lost and the DC voltage is fed from the DC power source line to the power feed port.

DETAILED DESCRIPTION

Hereinafter, embodiments of a heat pump device and a valve opening circuit of the heat pump device will be described.

A representative example of the heat pump device is an air conditioner. The air conditioner will be described as an example.

Figure 1:
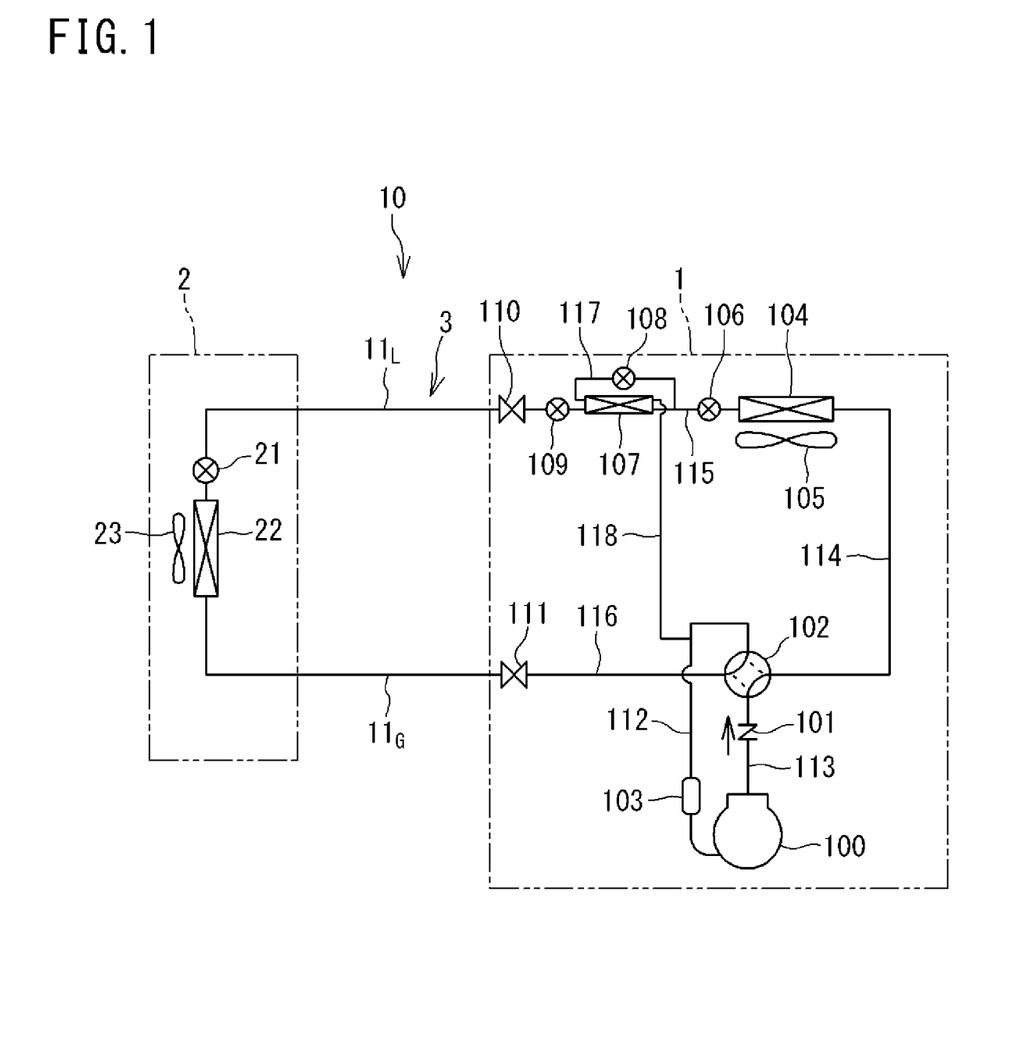
FIG. 1 is a schematic configuration diagram of a refrigerant circuit of an air conditioner.

FIG. 1 is a schematic configuration diagram of a refrigerant circuit of an air conditioner 10. The air conditioner 10 is a device that performs cooling or heating in a building by a vapor compression refrigeration cycle. The air conditioner 10 is configured by connecting an outdoor unit 1 and an indoor unit 2 by a refrigerant circuit 3. Although only one indoor unit 2 is illustrated, a plurality of indoor units 2 are actually connected in parallel in accordance with a scale of equipment. As a refrigerant, for example, R32 is used.

<<Outdoor Unit>>

The outdoor unit 1 is installed outdoors or outside a room in a building. The outdoor unit 1 is connected to the indoor unit 2 via a liquid-refrigerant connection pipe $11_L$ and a gas-refrigerant connection pipe $11_G$. The outdoor unit 1 includes a compressor 100, a check valve 101, a four-way switching valve 102, an accumulator 103, an outdoor heat exchanger 104, an outdoor expansion valve 106, a refrigerant cooler 107, an expansion valve 108 for returning refrigerant, an expansion valve 109 for adjusting liquid-refrigerant pressure, a liquid-side shutoff valve 110, and a gas-side shutoff valve 111.

The four-way switching valve 102 can mutually switch between a heat radiation operation state in which the outdoor heat exchanger 104 functions as a refrigerant radiator, and an evaporation operation state in which the outdoor heat exchanger 104 functions as a refrigerant evaporator. The four-way switching valve 102 and a suction side of the compressor 100 are connected via a suction refrigerant pipe 112. The suction refrigerant pipe 112 is provided with the accumulator 103 that temporarily accumulates a refrigerant suctioned into the compressor 100. The compressor 100 is a device for compressing the refrigerant, and for example, a device having a sealed structure such as a rotary type or a scroll type is used.

The check valve 101 for prevention of a backflow is provided in between in a discharge refrigerant pipe 113 connecting a discharge side of the compressor 100 and the four-way switching valve 102. The four-way switching valve 102 and a gas-side end of the outdoor heat exchanger 104 are connected by a first outdoor gas-refrigerant pipe 114. A liquid-side end of the outdoor heat exchanger 104 and the liquid-refrigerant connection pipe $11_L$ are connected via an outdoor liquid-refrigerant pipe 115.

At a connecting part between the outdoor liquid-refrigerant pipe 115 and the liquid-refrigerant connection pipe $11_L$, the liquid-side shutoff valve 110 is provided. The four-way switching valve 102 and the gas-refrigerant connection pipe $11_G$ are connected via a second outdoor gas-refrigerant pipe 116. At a connecting part between the second outdoor gas-refrigerant pipe 116 and the gas-refrigerant connection pipe $11_G$, the gas-side shutoff valve 111 is provided. The liquid-side shutoff valve 110 and the gas-side shutoff valve 111 are valves to be manually opened and closed, for example.

When the outdoor heat exchanger 104 functions as a refrigerant radiator (hereinafter referred to as an "outdoor heat radiation state"), the four-way switching valve 102 connects the discharge side of the compressor 100 and a gas side of the outdoor heat exchanger 104 (a state of the four-way switching valve 102 indicated by a solid line in FIG. 1). When the outdoor heat exchanger 104 functions as a refrigerant evaporator (hereinafter referred to as an "outdoor heat evaporation state"), the suction side of the compressor 100 and the gas side of the outdoor heat exchanger 104 (a state of the four-way switching valve 102 indicated by a broken line in FIG. 1) are connected. At a time of the cooling operation, the four-way switching valve 102 is switched to the outdoor heat radiation state. At a time of the heating operation, the four-way switching valve 102 is switched to the outdoor heat evaporation state.

The outdoor heat exchanger 104 functions as a refrigerant radiator or functions as a refrigerant evaporator. The outdoor fan 105 supplies outdoor air as a cooling source or a heating source of the refrigerant flowing through the outdoor heat exchanger 104, to the outdoor heat exchanger 104.

The outdoor expansion valve 106 and the expansion valve 109 are provided on the outdoor liquid-refrigerant pipe 115. The outdoor expansion valve 106 is an electric valve that decompresses the refrigerant during the heating operation, and is provided at a portion of the outdoor liquid-refrigerant pipe 115 close to the liquid-side end of the outdoor heat exchanger 104. The expansion valve 109 is an electric valve that decompresses the refrigerant such that the refrigerant flowing through the liquid-refrigerant connection pipe $11_L$ is in a gas-liquid two-phase state during the cooling operation, and is provided in a portion of the outdoor liquid-refrigerant pipe 115 close to the liquid-refrigerant connection pipe $11_L$. The expansion valve 109 is provided at a portion of the outdoor liquid-refrigerant pipe 115 closer to the liquid-refrigerant connection pipe $11_L$ than the outdoor expansion valve 106.

During the cooling operation, the air conditioner 10 causes the refrigerant in the gas-liquid two-phase state to flow into the liquid-refrigerant connection pipe $11_L$ by the expansion valve 109, and performs two-phase conveyance of the refrigerant sent from the outdoor unit 1 to the indoor unit 2.

To the refrigerant cooler 107, a refrigerant return pipe 117 having the expansion valve 108 interposed in between is connected. To the refrigerant cooler 107, a refrigerant return outlet pipe 118 is connected. The refrigerant return outlet pipe 118 is connected to the suction refrigerant pipe 112.

A part of the refrigerant flowing through the outdoor liquid-refrigerant pipe 115 is split from a portion between the outdoor expansion valve 106 and the refrigerant cooler 107, and sent to an inlet (a left side in FIG. 1) of the refrigerant cooler 107 close to the refrigerant return pipe 117. The expansion valve 108 of the refrigerant return pipe 117 decompresses the refrigerant flowing in the refrigerant return pipe 117 as well as adjusting a flow rate of the refrigerant flowing in the refrigerant cooler 107. The expansion valve 108 is an electric valve.

The refrigerant return outlet pipe 118 sends the refrigerant to from an outlet of the refrigerant cooler 107 close to the refrigerant return pipe 117 to the suction refrigerant pipe 112. The refrigerant return outlet pipe 118 of the refrigerant return pipe 117 is connected to the accumulator 103 via the suction refrigerant pipe 112.

The refrigerant cooler 107 is a heat exchanger that cools the refrigerant flowing through a portion of the outdoor liquid-refrigerant pipe 115 closer to the outdoor heat exchanger 104 than the expansion valve 109 by the refrigerant flowing through the refrigerant return pipe 117. In the refrigerant cooler 107, the refrigerant through the refrigerant return pipe 117 and the refrigerant through the outdoor liquid-refrigerant pipe 115 are counterflow during the cooling operation.

<<Indoor Unit>>

The indoor unit 2 is installed inside a room in a building. As described above, the indoor unit 2 is connected to the outdoor unit 1 via the liquid-refrigerant connection pipe $11_L$ and the gas-refrigerant connection pipe $11_G$ to constitute a part of the refrigerant circuit 3.

The indoor unit 2 mainly has an indoor expansion valve 21 and an indoor heat exchanger 22. A side with the indoor expansion valve 21 is connected to the liquid-refrigerant connection pipe $11_L$, and the opposite side is connected to the gas-refrigerant connection pipe $11_G$. The indoor expansion valve 21 is an electric valve that adjusts a flow rate of the refrigerant flowing through the indoor heat exchanger 22 while decompressing the refrigerant. The indoor heat exchanger 22 functions as a refrigerant evaporator to cool indoor air or functions as a refrigerant radiator to heat indoor air. An indoor fan 23 sucks the indoor air into the indoor unit 2, exchanges heat with the refrigerant in the indoor heat exchanger 22, and then supplies the indoor air as supply air to the room.

<<Refrigerant Collection>>

Figure 2:
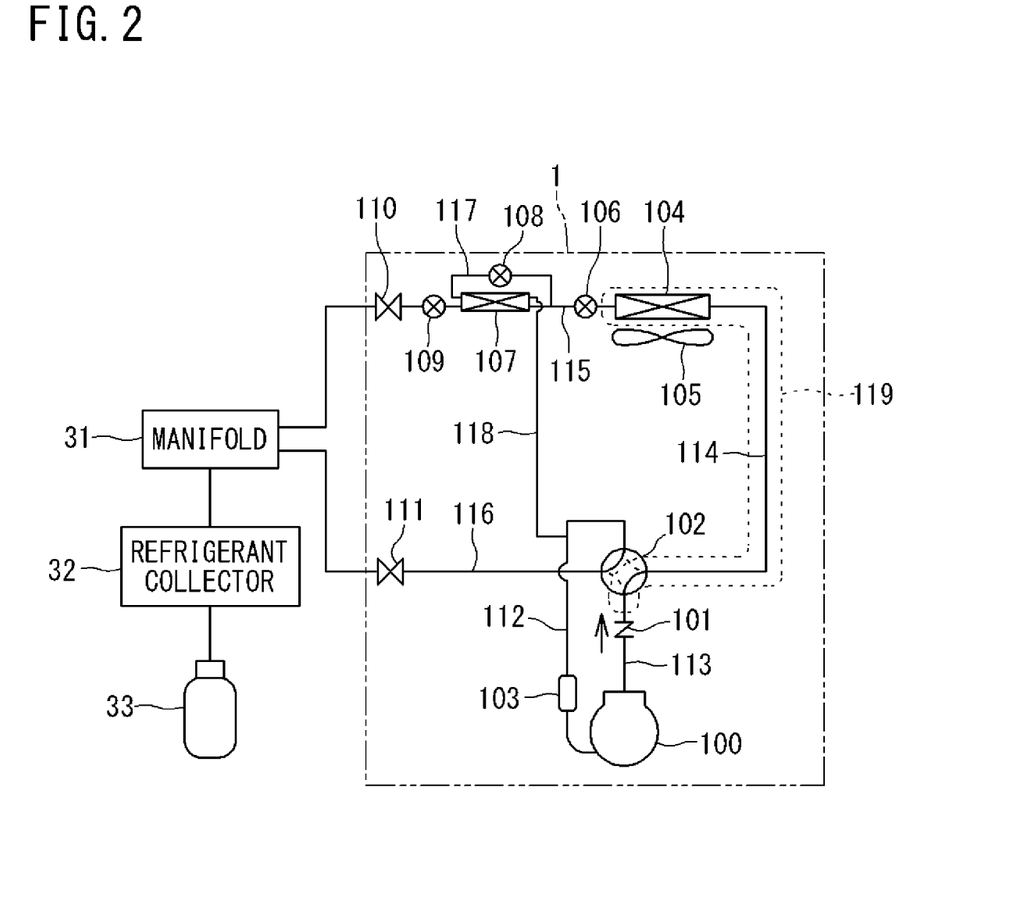
FIG. 2 is a diagram illustrating a state in which an outdoor unit is removed from the air conditioner illustrated in FIG. 1 and a refrigerant is collected.

FIG. 2 is a diagram illustrating a state in which the outdoor unit 1 is removed from the air conditioner 10 illustrated in FIG. 1 and the refrigerant is collected. The liquid-side shutoff valve 110 and the gas-side shutoff valve 111 of the outdoor unit 1 are opened and connected to a refrigerant collector 32 via a manifold 31. A cylinder 33 is connected to the refrigerant collector 32. By operating the refrigerant collector 32, the refrigerant remaining in the outdoor unit 1 can be sucked and collected in the cylinder 33.

When the outdoor expansion valve 106, the expansion valve 108, and the expansion valve 109, which are electric valves, are closed, the refrigerant remaining in the outdoor unit 1 cannot be completely collected. In particular, a relatively large amount of refrigerant trapped in a section 119 between the outdoor expansion valve 106 and the check valve 101 cannot be collected. In the present disclosure, the electric valves can be opened even in such a case.

<<First Embodiment of Valve Opening Circuit>>

Figure 3:
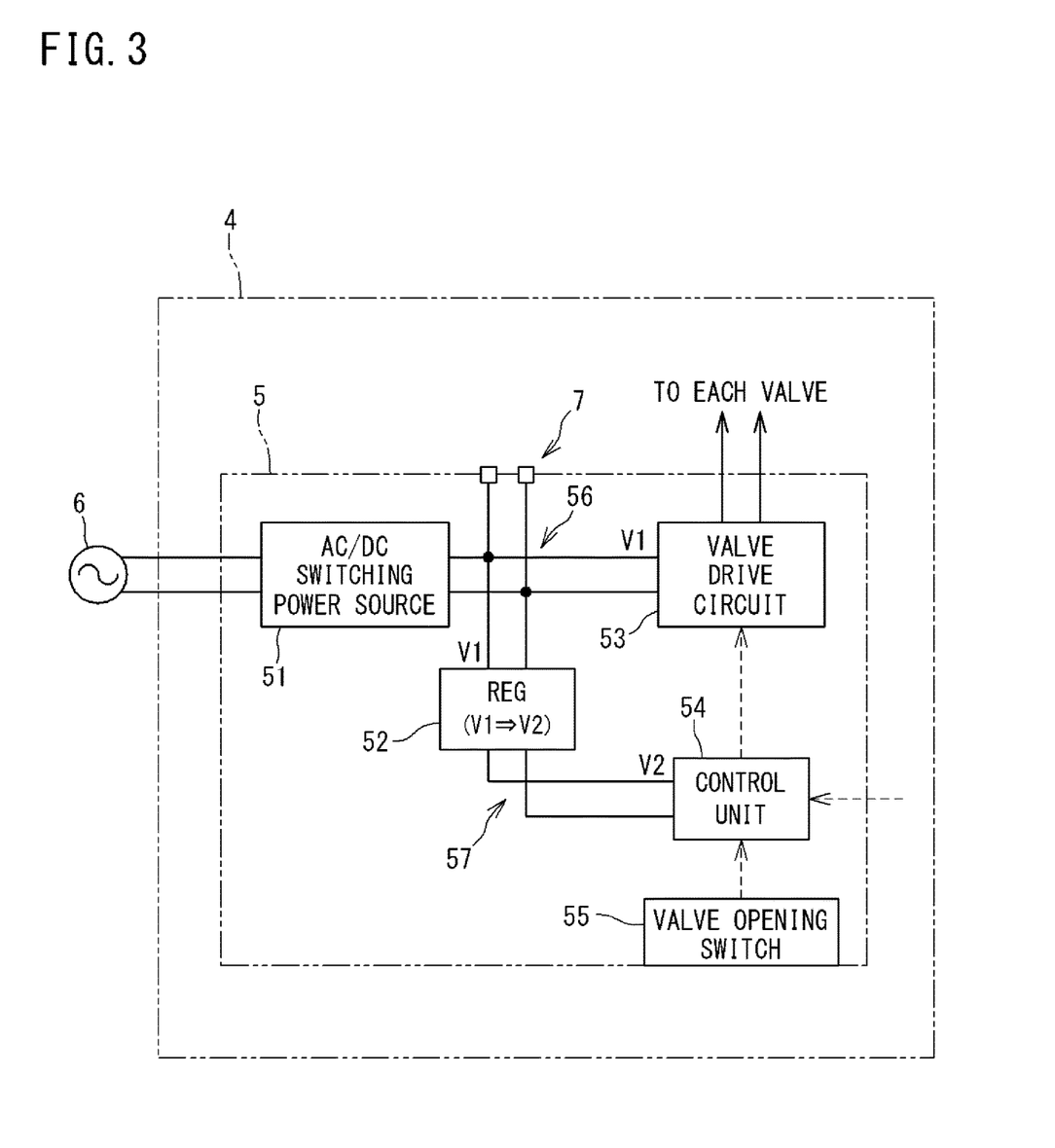
FIG. 3 is a circuit diagram illustrating an example of a valve opening circuit provided in a power source box.

FIG. 3 is a circuit diagram illustrating an example of a valve opening circuit 5 provided in a power source box 4. The power source box 4 is provided in the outdoor unit 1. In FIG. 3, the valve opening circuit 5 includes an AC/DC switching power source 51, a regulator 52, a valve drive circuit 53, a control unit 54, and a valve opening switch 55.

In a normal use state of the air conditioner 10, a normal AC voltage is fed from a commercial AC power source 6 to the AC/DC switching power source 51. The AC/DC switching power source 51 converts the AC voltage into a predetermined DC voltage V1, and outputs the DC voltage to a DC electric path 56. The valve drive circuit 53 and the regulator 52 are connected to the DC electric path 56. The power feed port 7 is connected to the DC electric path 56. An actual form of the power feed port 7 is a terminal block or a connector.

The valve drive circuit 53 can open and close each electric valve (the outdoor expansion valve 106, the expansion valve 108, and the expansion valve 109) on the basis of the DC voltage V1. The regulator 52 steps down the DC voltage V1 to a power source voltage V2 (=Vcc, V2<V1) of the control unit 54, and outputs the DC voltage V1 to a DC electric path 57. The control unit 54 includes a microcomputer and operates on the basis of a computer program. A valve opening-closing signal can be given from outside to the control unit 54. On the basis of the valve opening-closing signal, the control unit 54 gives a drive signal to the valve drive circuit 53 to open and close each electric valve. A valve opening command signal can be given from the valve opening switch 55 to the control unit 54. The valve opening switch 55 is a manual switch and is operated by a service engineer. The power feed port 7 is not used when the air conditioner 10 is in the normal use state.

Figure 4:
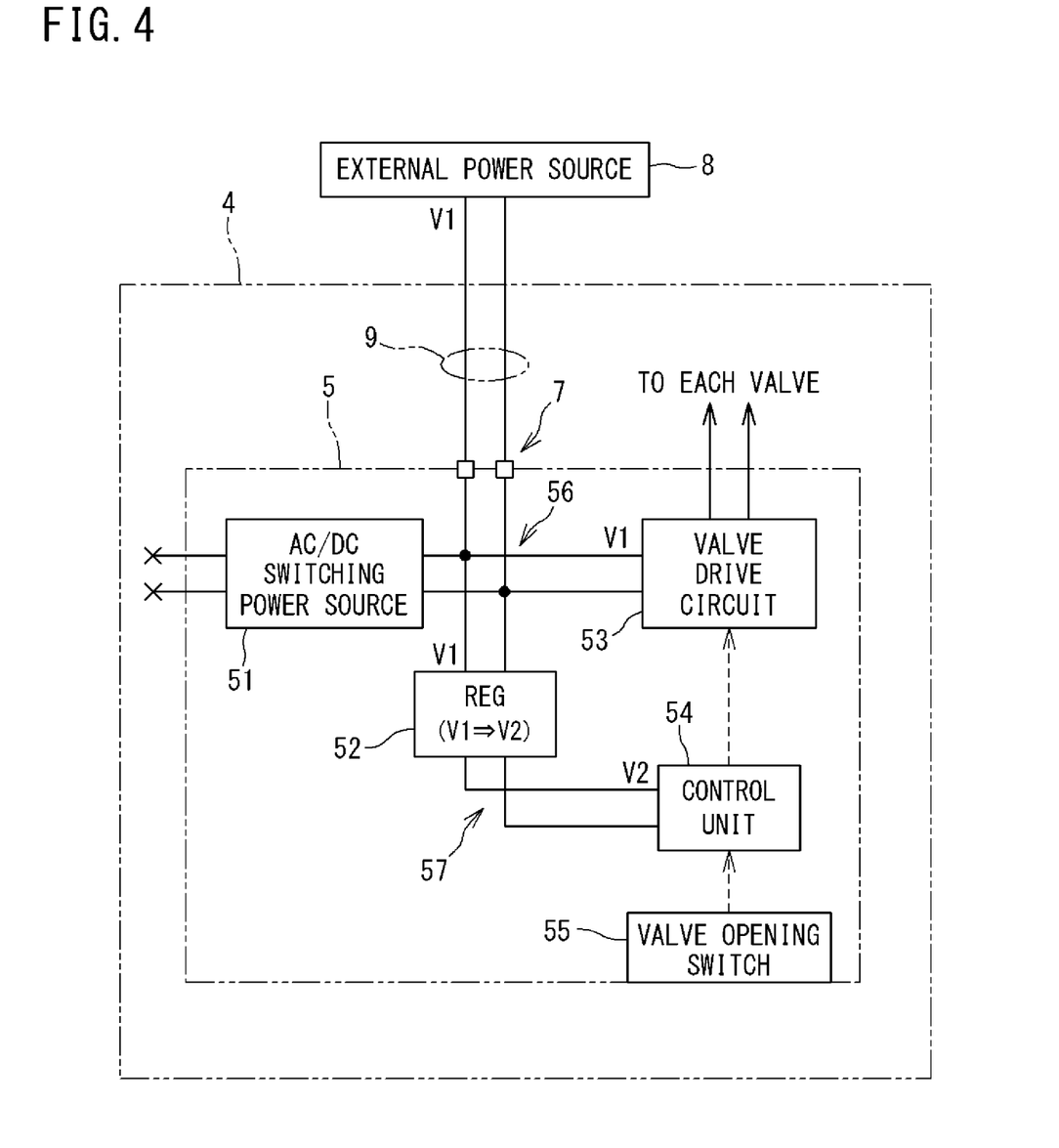
FIG. 4 is a circuit diagram related to the valve opening circuit in the power source box in a state where connection with a commercial AC power source is disconnected in order to remove an outdoor unit.

FIG. 4 is a circuit diagram of the valve opening circuit 5 in the power source box 4 in a state where connection with the commercial AC power source 6 is disconnected in order to remove the outdoor unit 1. In the drawing, AC voltage is not fed to the AC/DC switching power source 51. Here, a DC power source line 9 is connected to the power feed port 7 from an external power source (DC power source) 8 capable of outputting the DC voltage V1. As a result, even when the AC/DC switching power source 51 is not functioning, the DC voltage V1 can be generated in the DC electric path 56. The regulator 52 steps down the DC voltage V1 to the power source voltage V2 of the control unit 54, and outputs the DC voltage V1 to the DC electric path 57.

From this state, when the service engineer operates the valve opening switch 55, the control unit 54 transmits a valve opening signal to the valve drive circuit 53. Upon receipt of the valve opening signal, the valve drive circuit 53 opens each electric valve (the outdoor expansion valve 106, the expansion valve 108, and the expansion valve 109). The electric valves can thus be opened even after the outdoor unit 1 is disconnected from the commercial AC power source 6.

Thereafter, the refrigerant remaining in the outdoor unit 1 can be collected by connecting the refrigerant collector 32 as illustrated in FIG. 2.

<<Location of Power Feed Port>>

Figure 5:
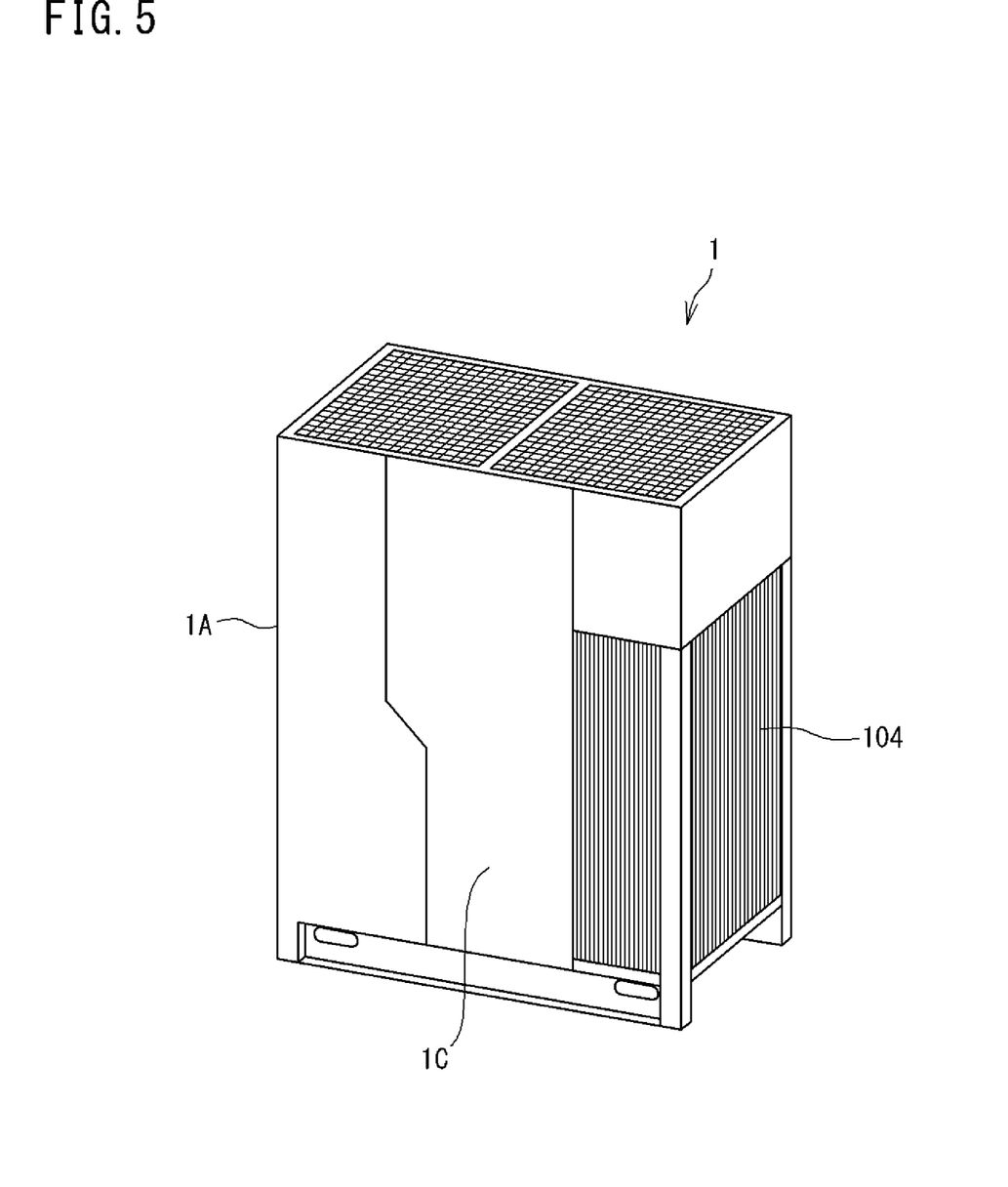
FIG. 5 is a perspective view illustrating an example of an external appearance of the outdoor unit.

FIG. 5 is a perspective view illustrating an example of an external appearance of the outdoor unit 1. What can be seen in this drawing is a housing 1A and the outdoor heat exchanger 104 of the outdoor unit 1. A cover 1C that is easily removed is attached to a part of an outer surface of the housing 1A.

Figure 6:
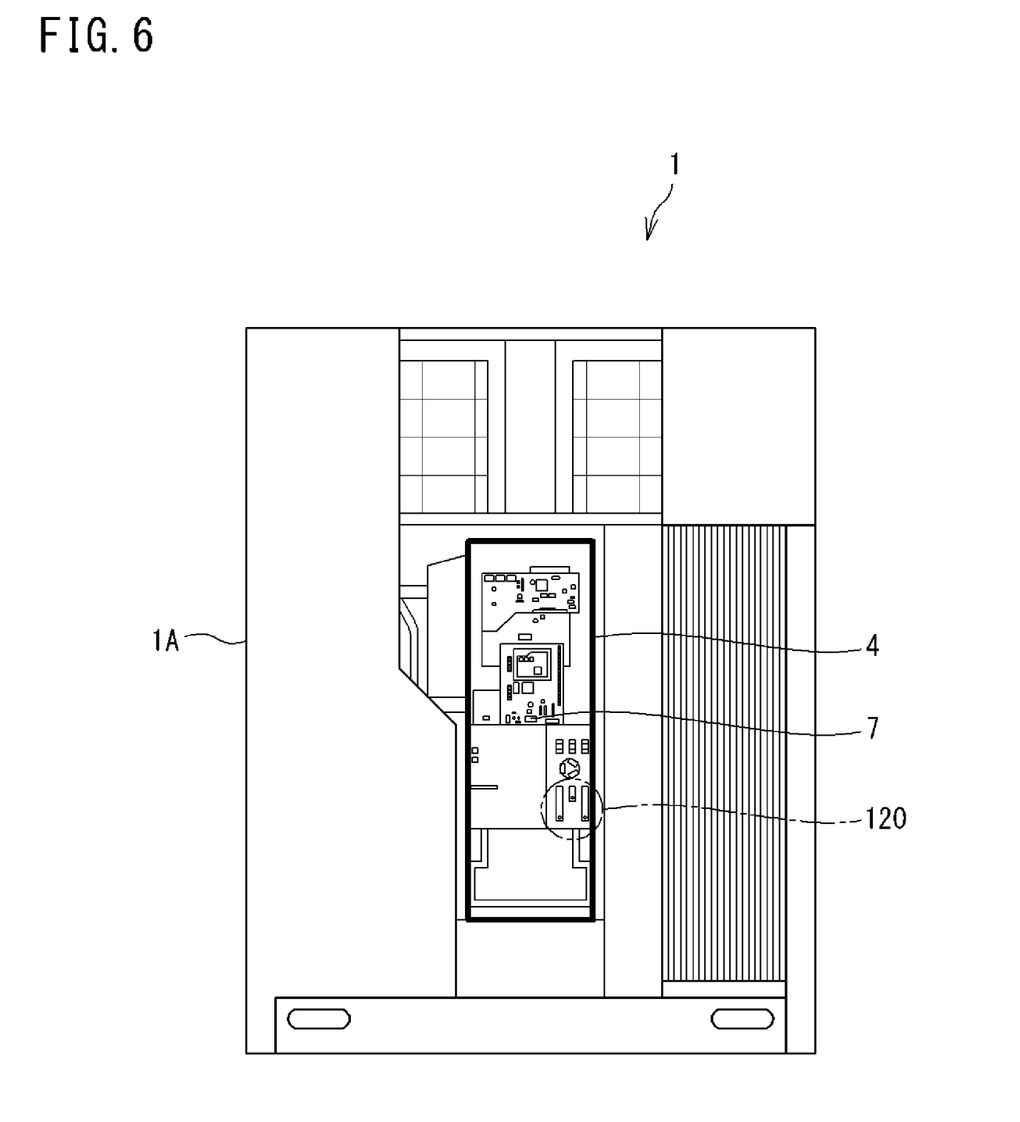
FIG. 6 is a front view of the outdoor unit with a cover removed.

FIG. 6 is a front view of the outdoor unit 1 with the cover 1C removed. When the cover 1C is removed, the power source box 4 and the inside thereof are exposed. In the power source box 4, there is an external line terminal 120 as a source for connecting the commercial AC power source to the outdoor unit 1. The power feed port 7 is disposed, for example, near the external line terminal 120.

<<Second Embodiment of Valve Opening Circuit>>

Figure 7:
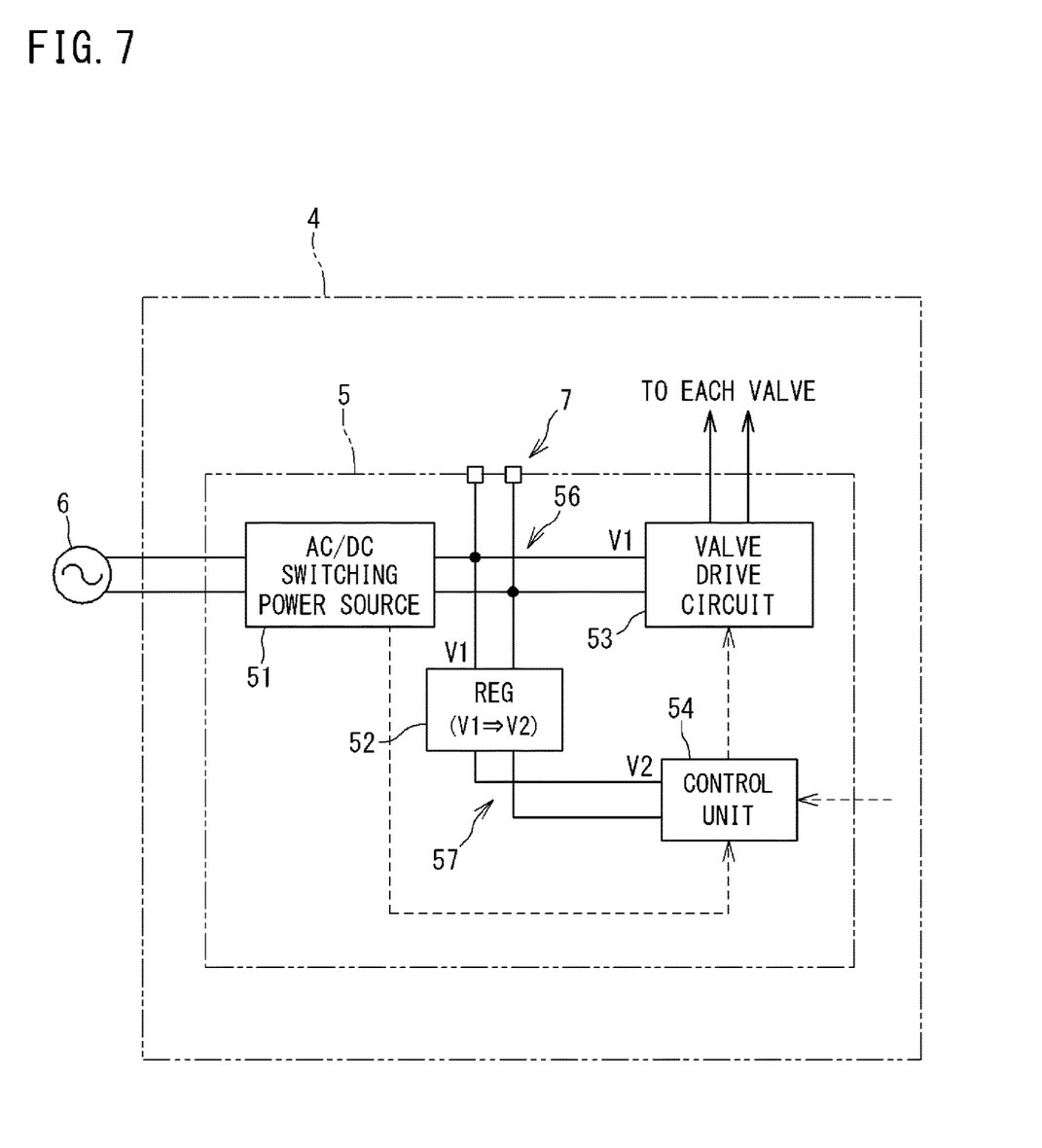
FIG. 7 is a circuit diagram illustrating another example of the valve opening circuit provided in the power source box.

FIG. 7 is a circuit diagram illustrating another example of the valve opening circuit 5 provided in the power source box 4. The difference from FIG. 3 is that there is no valve opening switch 55 provided in FIG. 3, and instead, a signal can be sent from the AC/DC switching power source 51 to the control unit 54. This signal is a signal notifying that the AC voltage is lost. Specifically, for example, by using a B contact of a relay, the contact is to be opened when there is an AC voltage, and the contact is to be closed when the AC voltage is lost. The contact being closed is a signal indicating that the AC voltage is lost. Since the operation of the valve opening circuit 5 according to a second embodiment is not different from the operation according to the first embodiment in the normal use state of the air conditioner 10, the description thereof will be omitted.

Figure 8:
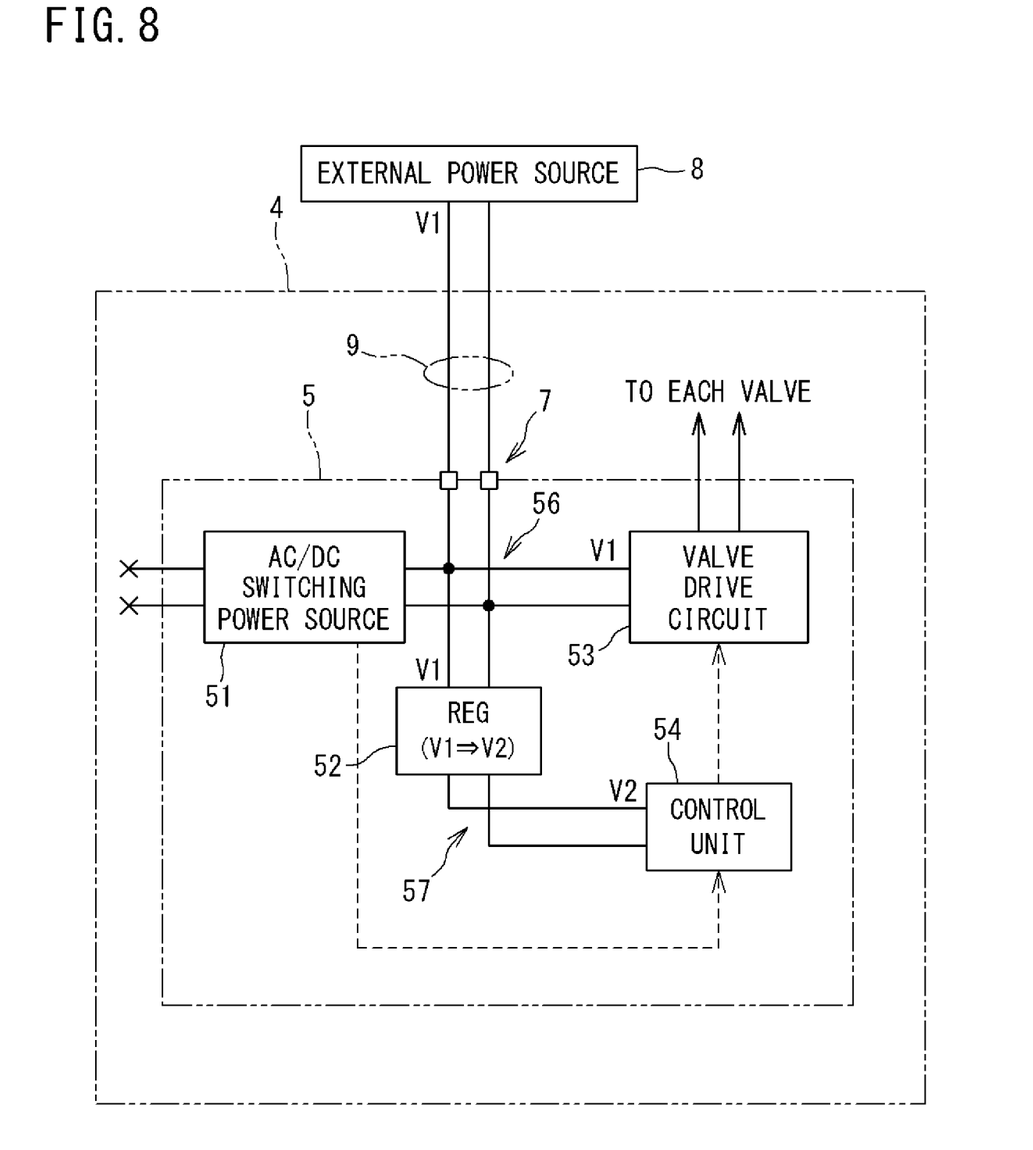
FIG. 8 is a circuit diagram of the valve opening circuit in the power source box in a state where connection with the commercial AC power source is disconnected in order to remove the outdoor unit.

FIG. 8 is a circuit diagram of the valve opening circuit 5 in the power source box 4 in a state where connection with the commercial AC power source 6 is disconnected in order to remove the outdoor unit 1. In the drawing, AC voltage is not fed to the AC/DC switching power source 51. This state is notified to the control unit 54. Here, a DC power source line 9 is connected to the power feed port 7 from an external power source (DC power source) 8 capable of outputting the DC voltage V1. As a result, even when the AC/DC switching power source 51 is not functioning, the DC voltage V1 can be generated in the DC electric path 56. The regulator 52 steps down the DC voltage V1 to the power source voltage V2 of the control unit 54, and outputs the DC voltage V1 to the DC electric path 57.

In this state, the control unit 54 receives a signal indicating that the AC voltage is lost from the AC/DC switching power source 51 although the voltage V2 is applied. As a result, the control unit 54 determines that the AC voltage is lost and the DC voltage V1 is fed from the external power source 8 to the power feed port 7.

The control unit 54 thus determined sends a valve opening signal to the valve drive circuit 53. Upon receipt of the valve opening signal, the valve drive circuit 53 opens each electric valve (the outdoor expansion valve 106, the expansion valve 108, and the expansion valve 109). The electric valves can thus be opened even after the outdoor unit 1 is disconnected from the commercial AC power source 6.

Thereafter, the refrigerant remaining in the outdoor unit 1 can be collected by connecting the refrigerant collector 32 as illustrated in FIG. 2.

<<Supplement to Application Example of Valve Opening Circuit>>

Figure 9:
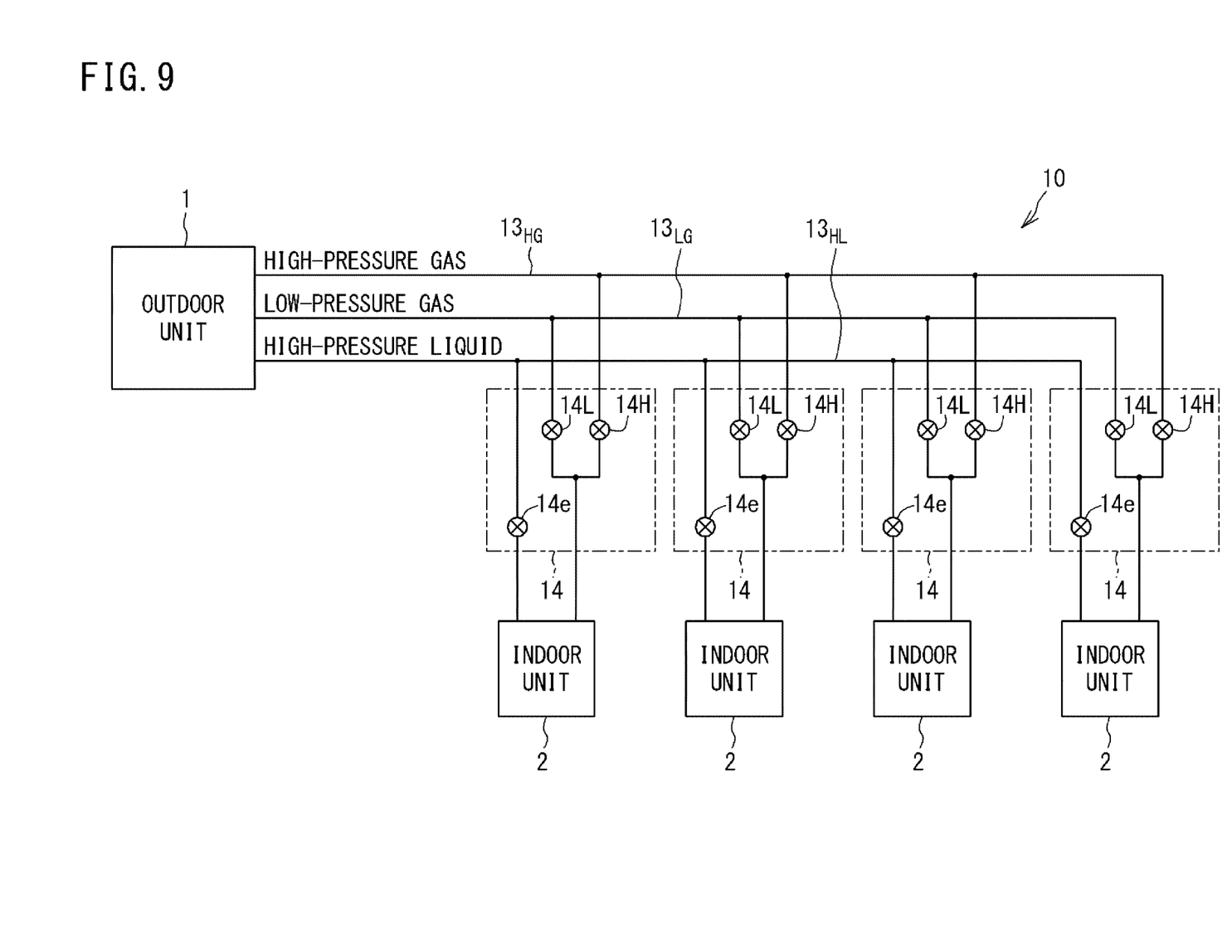
FIG. 9 is a diagram illustrating an example of a configuration in a case where the air conditioner is of simultaneous cooling and heating.

FIG. 9 is a diagram illustrating an example of a configuration in a case where the air conditioner 10 is of simultaneous cooling and heating.

In the drawing, from the outdoor unit 1 of simultaneous cooling and heating, a plurality of (here, four) flow path switching units 14 are connected via a high-pressure gas pipe $13_{HG}$ through which a high-pressure gas refrigerant flows, a low-pressure gas pipe $13_{LG}$ through which a low-pressure gas refrigerant flows, and a high-pressure liquid pipe $13_{HL}$ through which a high-pressure liquid refrigerant flows. The indoor unit 2 is connected to each of the flow path switching units 14. The flow path switching units 14 and the indoor units 2 form a refrigerant circuit that shares the outdoor unit 1. Note that, although four flow path switching units 14 and indoor units 2 are illustrated here, the number is merely an example for convenience of illustration. The flow path switching units 14 can be installed either outdoors or indoors.

Each of the flow path switching units 14 includes an electric valve 14H connected to the high-pressure gas pipe $13_{HG}$, an electric valve 14L connected to the low-pressure gas pipe $13_{LG}$, and an electric valve 14e connected to the high-pressure liquid pipe $13_{HL}$.

The air conditioner 10 of simultaneous cooling and heating described above can cause any indoor unit 2 to perform an air conditioning (cooling or heating) operation as a use-side unit under the outdoor unit 1 common as a heat source-side unit. The flow path switching units 14 can also cause some of the indoor units 2 to perform cooling and other indoor units 2 to perform heating. Specifically, controlling opening and closing of the electric valves 14H and 14L enables the refrigerant flow path to be switched. Controlling an opening degree of the electric valve 14e as necessary enables adjustment of a flow rate of the refrigerant flowing through a heat exchanger in the indoor unit 2. The electric valves 14H, 14L, and 14e in each of the flow path switching unit 14 can also be used as shutoff valves.

Since the flow path switching units 14 as described above also use an electric valve, there is a case where the refrigerant is trapped. It is therefore also conceivable to apply the valve opening circuit 5 as described above to the flow path switching unit 14 to release the trapped refrigerant.

In an intermediate unit of a system having a binary refrigerant circuit, such as a chiller system, if an electric valve is provided inside, there is also a case where a refrigerant is trapped. It is therefore also conceivable to apply the valve opening circuit 5 to the intermediate unit to release the trapped refrigerant.

Action and Effects of Embodiment

Technical Problem

When an existing air conditioner is removed, the air conditioner is generally physically disconnected from the commercial AC power source, and then a collection worker collects the refrigerant inside using a refrigerant collector. However, when the internal valve is closed, there is a closed section on the refrigerant circuit, and the refrigerant cannot be completely collected although sucked by the refrigerant collector. An object of the present disclosure is to more reliably collect a refrigerant from a heat pump device such as an air conditioner to be removed.

Summary of Disclosure

Although the valves to be operated by the valve drive circuit 53 has been described as electric valves so far, the valve opening circuit 5 of the present disclosure is also applicable to opening and closing of an electromagnetic valve.

A summary of the above disclosure can be expressed in a generalized manner as follows.
(Valve Opening Circuit)

A valve opening circuit of the present disclosure is a valve opening circuit 5 mounted on a heat pump device (air conditioner 10) having a valve (outdoor expansion valve 106 or the like) on a refrigerant circuit 3, the valve opening circuit including a DC electric path 56 to which a DC voltage generated from an AC voltage for normal use is applied, a valve drive circuit 53 that opens and closes the valve by using the DC voltage of the DC electric path 56, a control unit 54 that acquires a control power source voltage based on the DC voltage of the DC electric path 56 and controls the valve drive circuit 53, and a power feed port 7 connected to the DC electric path 56 and connectable to a DC power source line 9 provided from outside for emergency. The control unit 54 causes the valve drive circuit 53 to open the valve when the AC voltage is lost and the DC voltage is fed from the DC power source line 9 to the power feed port 7.

When the heat pump device including the valve opening circuit 5 as described above is removed, even if the AC voltage of the commercial AC power source 6 is lost, the DC power source line 9 can be connected to the power feed port 7 to feed the DC voltage to the DC electric path 56. By opening the valve in this state, the refrigerant remaining in the heat pump device can be reliably collected by the refrigerant collector 32.

In the valve opening circuit 5, the control unit 54 may open the valve when a condition that the AC voltage is lost and the DC voltage is fed from the DC power source line 9 to the power feed port 7 is satisfied.

In this case, when connection with the commercial AC power source 6 is disconnected from the heat pump device and the DC voltage is fed to the power feed port 7, the valve can be automatically opened such that the refrigerant can be collected.

The valve opening circuit 5 can also include a valve opening switch 55. The control unit 54 is to open the valve when the AC voltage is lost and the valve opening switch 55 is opened in a state where the DC power source line 9 is connected to the power feed port 7.

In this case, the valve is not opened only by disconnecting the heat pump device from the commercial AC power source 6 and feeding the DC voltage to the power feed port 7, but also by operating the valve opening switch 55. Thus, the valve opening switch 55 can be operated after the refrigerant collector 32 is reliably connected to the heat pump device. This makes it possible to collect the refrigerant while avoiding leakage of the refrigerant into the atmosphere as much as possible.
(Heat Pump Device)

Disclosed is a heat pump device (air conditioner 10) having a valve (outdoor expansion valve 106 or the like) on a refrigerant circuit 3, the heat pump device including a DC electric path 56 to which a DC voltage generated from an AC voltage for normal use is applied, a valve drive circuit 53 that opens and closes the valve by using the DC voltage of the DC electric path 56, a control unit 54 that acquires a control power source voltage based on the DC voltage of the DC electric path 56 and controls the valve drive circuit 53, and a power feed port 7 connected to the DC electric path 56 and connectable to a DC power source line 9 provided from outside for emergency. The control unit 54 causes the valve drive circuit 53 to open the valve when the AC voltage is lost and the DC voltage is fed from the DC power source line 9 to the power feed port 7.

With the heat pump device as described above, when the heat pump device is removed, even if the AC voltage of the commercial AC power source 6 is lost, the DC power source line 9 can be connected to the power feed port 7 to feed the DC voltage to the DC electric path 56. By opening the valve in this state, the refrigerant remaining in the heat pump device can be reliably collected by the refrigerant collector 32.

The heat pump device preferably include a power source box 4, in which the power feed port 7 is provided in the power source box 4.

In this case, the power feed port 7 that is not used except when the heat pump device is removed can be accommodated in the power source box 4 without being unnecessarily exposed.

The power source box 4 is preferably provided at a position to be exposed in a state where a cover 1C on a part of an outer surface of a housing 1A of the heat pump device is removed.

In this case, when the cover 1C is removed, the power source box 4 is exposed, and the DC power source line 9 can be connected to the power feed port 7.

The power source box 4 is preferably provided inside with an external line terminal 120 that feeds the AC voltage, and the power feed port 7 is preferably provided near the external line terminal.

In this case, after the power source box 4 is exposed and a cable for feeding the commercial AC power source 6 to the external line terminal 120 is removed, the DC power source line 9 can be connected to the power feed port 7 in that state, and therefore there is no waste in operation.

The valve is preferably provided in a pipe line from a heat exchanger (outdoor heat exchanger 104) to a liquid pipe (liquid-refrigerant connection pipe 11$_L$).

In this case, the refrigerant can be collected from before and after the heat exchanger in which a relatively large amount of refrigerant is likely to remain.

<<Others>>

At least part of the embodiments described above may be appropriately combined with each other.

While the embodiments have been described above, various modifications to modes and details should be available without departing from the object and the scope of the claims.

REFERENCE SIGNS LIST 1 outdoor unit
1A housing
1C cover
2 indoor unit
3 refrigerant circuit
4 power source box
5 valve opening circuit
6 commercial AC power source
7 power feed port
8 external power source
9 DC power source line
10 air conditioner
11$_L$ liquid-refrigerant connection pipe
11$_G$ gas-refrigerant connection pipe
13$_{HG}$ high-pressure gas pipe
13$_{LG}$ low-pressure gas pipe
13$_{HL}$ high-pressure liquid pipe
14 flow path switching unit
14$e$, 14H, 14L electric valve
21 indoor expansion valve
22 indoor heat exchanger
23 indoor fan
31 manifold
32 refrigerant collector
33 cylinder
51 AC/DC switching power source
52 regulator
53 valve drive circuit
54 control unit
55 valve opening switch
56, 57 DC electric path
100 compressor
101 check valve
102 four-way switching valve
103 accumulator
104 outdoor heat exchanger
105 outdoor fan
106 outdoor expansion valve
107 refrigerant cooler
108 expansion valve
109 expansion valve
110 liquid-side shutoff valve
111 gas-side shutoff valve
112 suction refrigerant pipe
113 refrigerant discharge pipe
114 first outdoor gas-refrigerant pipe
115 outdoor liquid-refrigerant pipe
116 second outdoor gas-refrigerant pipe
117 refrigerant return pipe
118 refrigerant return outlet pipe
119 section
120 external line terminal

What is claimed is:

1. A valve opening circuit mounted on a heat pump device including a liquid-side shutoff valve, a gas-side shutoff valve, an outdoor expansion valve, a first expansion valve and a second expansion valve on a refrigerant circuit, the valve opening circuit comprising:
    a DC electric path to which a DC voltage generated from an AC voltage for normal use is applied;
    a valve drive circuit that opens and closes the liquid-side shutoff valve, the gas-side shutoff valve, the outdoor expansion valve, the first expansion valve and the second expansion valve by using the DC voltage of the DC electric path;
    a computer that acquires a control power source voltage based on the DC voltage of the DC electric path and controls the valve drive circuit; and
    a power feed port connected to the DC electric path and connectable to a DC power source line provided from outside for emergency, wherein
    the computer causes the valve drive circuit to open the liquid-side shutoff valve, the gas-side shutoff valve, the outdoor expansion valve, the first expansion valve and the second expansion valve when the AC voltage is lost and the DC voltage is fed from the DC power source line to the power feed port, such that the liquid-side shutoff valve, the gas-side shutoff valve, the outdoor expansion valve, the first expansion valve and the second expansion valve are simultaneously open.

2. The valve opening circuit according to claim 1, wherein the computer opens the liquid-side shutoff valve, the gas-side shutoff valve, the outdoor expansion valve, the first expansion valve and the second expansion valve when a condition that the AC voltage is lost and the DC voltage is fed from the DC power source line to the power feed port is satisfied.

3. The valve opening circuit according to claim 1, comprising a valve opening switch, wherein the computer opens the liquid-side shutoff valve, the gas-side shutoff valve, the outdoor expansion valve, the first expansion valve and the second expansion valve when the AC voltage is lost and the valve opening switch is operated for opening in a state where the DC power source line is connected to the power feed port.

4. A heat pump device including a liquid-side shutoff valve, a gas-side shutoff valve, an outdoor expansion valve, a first expansion valve and a second expansion valve on a refrigerant circuit, the heat pump device comprising:
   a DC electric path to which a DC voltage generated from an AC voltage for normal use is applied;
   a valve drive circuit that opens and closes the liquid-side shutoff valve, the gas-side shutoff valve, the outdoor expansion valve, the first expansion valve and the second expansion valve by using the DC voltage of the DC electric path;
   a computer that acquires a control power source voltage based on the DC voltage of the DC electric path and controls the valve drive circuit; and
   a power feed port connected to the DC electric path and connectable to a DC power source line provided from outside for emergency, wherein
   the computer causes the valve drive circuit to open the liquid-side shutoff valve, the gas-side shutoff valve, the outdoor expansion valve, the first expansion valve and the second expansion valve when the AC voltage is lost and the DC voltage is fed from the DC power source line to the power feed port, such that the liquid-side shutoff valve, the gas-side shutoff valve, the outdoor expansion valve, the first expansion valve and the second expansion valve are simultaneously open.

5. The heat pump device according to claim 4, comprising a power source box, wherein the power feed port is provided in the power source box.

6. The heat pump device according to claim 5, wherein the power source box is provided at a position to be exposed in a state where a cover on a part of an outer surface of a housing of the heat pump device is removed.

7. The heat pump device according to claim 5, wherein
   the power source box is provided inside with an external line terminal that feeds the AC voltage, and
   the power feed port is provided near the external line terminal.

8. The heat pump device according to claim 4, wherein the liquid-side shutoff valve is provided in a pipe line from a heat exchanger to a liquid pipe.

9. The heat pump device according to claim 6, wherein
   the power source box is provided inside with an external line terminal that feeds the AC voltage, and
   the power feed port is provided near the external line terminal.

* * * * *